United States Patent Office 3,073,128
Patented Jan. 15, 1963

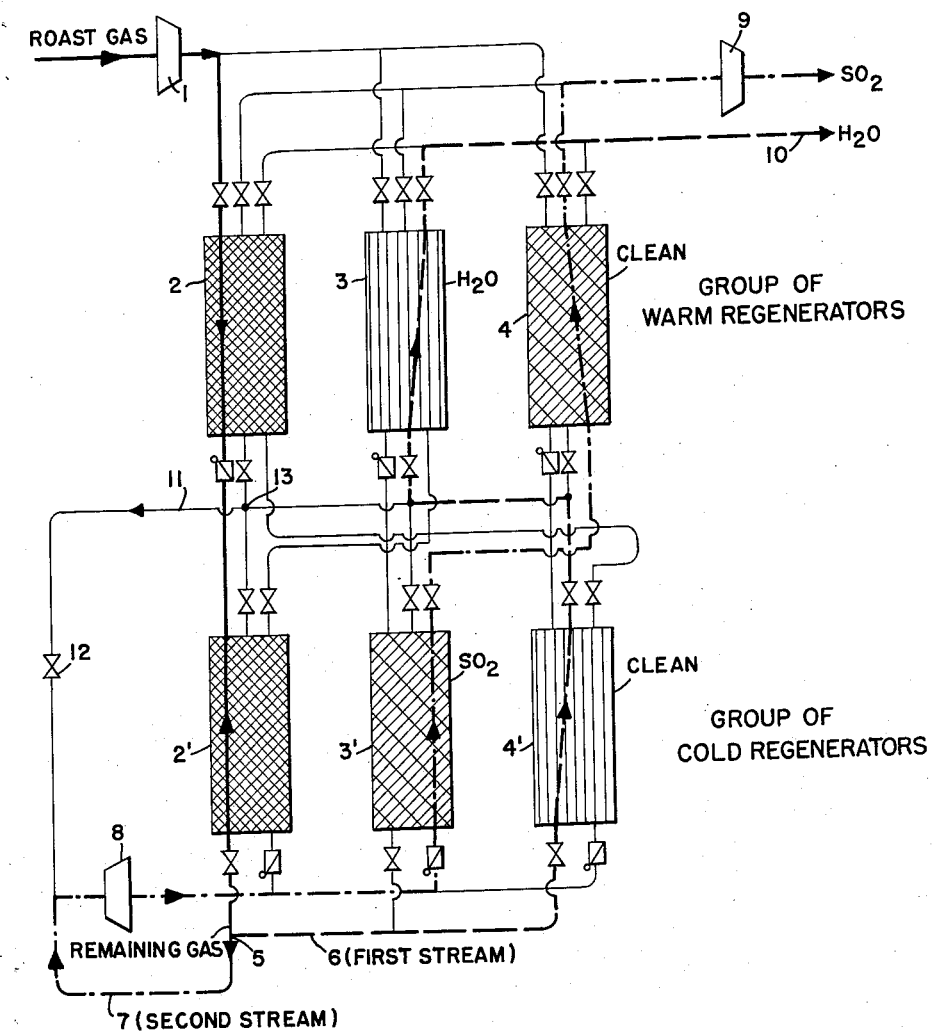

3,073,128
PROCESS FOR THE SELECTIVE SEPARATION OF COMPONENTS OF GASEOUS MIXTURES BY REGENERATIVE COOLING
Rudolf Becker, Munich-Solln, Germany, assignor to Gesellschaft für Linde's Eismaschinen Aktiengesellschaft, Munich, Germany, a company of Germany
Filed Aug. 11, 1958, Ser. No. 754,218
Claims priority, application Germany Sept. 21, 1957
8 Claims. (Cl. 62—12)

This invention relates to the art of separating a gas mixture into its individual constituents, and is particularly concerned with the provision of an improved procedure for selectively separating such a mixture through cooling by means of regenerators.

Reversible regenerators already have been used, for the selective separation of individual constituents from gas mixtures, in such a way that the regenerator was operated in the charging period at such a temperature that only the highest boiling constituent was separated from the gas mixture in liquid or solid form. If the starting mixture also contained other constituents whose presence was undesired in the separation, these undesired constituents were eliminated, according to another method, before or after the regenerator operation.

As an example, mention is made of the known separation of water and $SO_2$ from roast gases containing the same. Heretofore, it was customary to remove the water from the roast gas before introducing the latter into the regenerator and then to separate the $SO_2$ in the regenerator arrangement. However, many industrial plants do not have sulfuric acid—which is necessary for dehydrating the roast gases—available. In other mixtures it has transpired that their undesired constituents could not easily be eliminated with the available means.

It is also known to selectively separate, from gaseous mixtures containing the same, several constituents of different boiling points by means of regenerators. In this prior procedure, at first all constituents to be separated were retained in one regenerator and were removed from it in the discharge period by means of a scavenging gas. The gas mixture thus formed was then subjected to decomposition according to conventional methods particularly, according to a rectification method. This whole process was very expensive, however.

It is the object of the present invention to extend the very simple process of selective separation of constituents of gas mixtures by means of regenerators to several, that is, at least two selective separations without any chemical washing processes or rectification.

This problem is solved by the process according to the invention for the separation of higher boiling constituents from gas mixtures, for example, roast gases, by cooling by means of self-cleaning heat exchangers, i.e., reversible regenerators, reversing exchangers and the like, by the application of at least two regenerator units and reversing exchanger units respectively which are so connected in series and operated that at least two of these regenerators or reversing exchangers having different specific temperatures for the selective separations are traversed by the starting mixture in the charging period successively in the direction from the hotter to the colder unit, while the discharge period is subdivided into at least two operations so that the individual regenerators and reversing exchangers respectively are discharged again, by means of reduced pressure and/or a scavenging gas, in separate currents.

The two operations can be carried out principally simultaneously or successively. According to a special embodiment of the inventive idea, it has been found to be particularly advantageous to carry out the operations successively in different discharge periods in such manner that first the hotter regenerator (or reversing exchanger) is discharged, and then the cooler one by means of a reduction in pressure or by use of a scavenging gas. To this end, a valve system is provided by means of which a charged regenerator or reversing exchanger of one heating stage can be connected in the discharge period with one or more discharged regenerators or reversing exchangers of another heating stage either at the inlet or at the outlet side.

Preferably the mixture, freed from a constituent is used at the same time as a scavenging-and/or cooling gas. Cold is preferably produced by means of an expansion device, fed by a residual gas freed of its constituents to be separated, preferably an expansion machine.

An embodiment of apparatus operable for carrying out the process according to the invention is represented schematically and by way of an example in the accompanying drawing. It is assumed for the example that a roast gas containing water vapor and $SO_2$ is to be freed from these constituents separately.

In the drawing, 1 denotes a compressor blower; 2, 2', 3, 3', 4 and 4' are regenerators; 5 denotes a branch in the discharge conduit from regenerator 2'; 6 is a first stream conduit; 7 is a second stream conduit; 8 denotes an expansion turbine; 9 denotes a vacuum pump, and 10 denotes a discharge conduit for wet waste gas.

A damp roast gas, containing some 12% $SO_2$, is compressed in compressor 1 and, when the position of the valve is as shown in the drawing, led through regenerators 2 and 2', respectively. Water is separated from the stream in regenerator 2, $SO_2$ in regenerator 2'. The remaining gas, free of water and $SO_2$, is separated into two partial streams.

The first partial stream flows through conduit 6 to regenerator 4', which had been emptied in a previous period. It is heated there, and it flows on through regenerator 3, which was filled with water in a previous period, and vaporizes the water. At 10, the wet residual gas, which contains less than 0.2% $SO_2$, flows off.

The second partial stream goes through conduit 7 to expansion turbine 8, and is there efficiently decompressed. It is then sucked through regenerator 3' by vacuum pump 9, in which regenerator it vaporizes the $SO_2$ which was separated there in a previous period. The remaining gas, containing $SO_2$, then flows on through regenerator 4, which had been emptied in a preceding period, and is warmed in this regenerator. The dry residual gas, enriched by approximately 50% $SO_2$, flows off through vacuum pump 9.

The above procedure is illustrated in the drawing, in which the stream of raw roast gas is shown in solid line, the "first stream" is shown in broken line, and the "second stream" is shown as a dot-dash line.

After a designated time, the regenerators are again cyclically connected. This is accomplished in such a way that the roast gas compressed in compressor 1 henceforth streams through the empty regenerators 4 and 4', and the remaining gas is divided at the cold end of regenerator 4' into two streams; the first stream goes through regenerators 3' and 2, and vaporizes the water deposited in regenerator 2, and the second partial stream, after it is expanded in turbine 8, is sucked through regenerators 2' and 3 by vacuum pump 9, and is thereby separated from the $SO_2$ in regenerator 2.

Now the regenerators are again connected, this time in such a way that the roast gas compressed in compressor 1 will stream through regenerators 3 and 3'. The first partial stream thereby flows through regenerators 2' and 4 and vaporizes the water deposited in regenerator 4. The second partial stream passes through regenerators 4' and 2 and carries the SO₂ out of regenerator 4'; and so forth.

By suitable manipulation of the valves provided in the conduits shown in the drawing the pressure of the scavenging gas can be reduced as compared with that of the gas to be separated.

In order to be able to regulate the temperature of the residual gas to the turbine 8, a line 11, having a valve 12 therein is provided through which the hotter residual gas can be added to the cold residual gas arriving over 7. Thus additive gas is branched off at 13 between the regenerators.

The invention is not limited to the represented embodiment. If there is another suitable scavenging gas available, the turbine 8 can be connected into the scavenging gas current, if necessary or desirable.

If it is not desired to compress the starting mixture, which may contain CS₂ for example, a pump arrangement can be provided at the outlet 10 of the waste gas, while the blower 1 is omitted.

It is also possible to provide more than three pairs of hot and cold regenerators.

I claim:

1. A process for the selective separation of at least two high boiling constituents having different boiling points from gas mixtures containing the same and a residual gas by cooling by means of at least two groups of reversing heat exchangers being at different temperatures each group having such a temperature at its cold end, that only one high boiling component is completely condensed therein and that by means of valves and reversing heat-exchangers cyclically are connected in such a way one behind the other, that the gas mixture to be separated is passed in a first period through one regenerator of each group in the direction from higher temperature reversing heat-exchangers to lower temperature reversing heat-exchangers for condensing the high boiling constituents separately relative to their boiling points in said reversing heat-exchangers from the residual gas; in a second period passing a scavenging gas through a clean heat-exchanger of the group which is at lowest temperature and then through a heat-exchanger which is at higher temperature and in which has been condensed one high boiling constituent in a foregoing first period for withdrawing said condensed high boiling constituent; in a third period passing a scavenging gas through one of the reversing heat-exchangers of the group which is at lowest temperature and in which has been condensed another high boiling constituent in a foregoing first period; withdrawing said further condensed high boiling constituent and then passing it through a clean heat-exchanger of the group of heat-exchangers which are at higher temperature.

2. Process according to claim 1 in which said residual gas, freed from said high boiling constituents by cooling by means of reversing heat-exchangers, is used as a scavenging gas in the second and third periods.

3. Process according to claim 1 in which the pressure of the scavenging gas is reduced compared with that of the gas to be separated.

4. A process for the selective separation of two high boiling constituents, one having a higher and one having a lower boiling point, from a gas mixture containing the same and a residual gas, by cooling by means of two groups of regenerators, each group being at such a temperature that in the group of higher temperature only the higher boiling constituent is completely condensed therein and that in the group of lower temperature only a lower boiling component is completely condensed therein and that by means of valves the regenerators are cyclically connected in such a way, one behind the other, that the gas mixture to be separated is passed in a first period through one regenerator of each group 2, 2' in the direction from the higher temperature regenerator 2 to the lower temperature regenerator 2' for condensing the higher boiling constituent in the higher temperature regenerator 2 and the lower boiling component in the lower temperature regenerator 2'; dividing the residual gas mixture 5 into a first stream 6 and a second stream 7; in a second period passing the first stream 6 through a clean regenerator of the group which is at the lower temperature 4' and then through a regenerator 3 which is at higher temperature and in which in a foregoing first period the higher boiling constituent has been condensed; withdrawing said higher boiling constituent; in a third period passing said second stream 7 through a regenerator 3' which is at a lower temperature and in which in a foregoing first period the lower boiling constituent has been condensed; withdrawing said lower boiling constituent and then passing it through a clean regenerator 4 which is at higher temperature, warming it thereby.

5. A process for the selective separation of two high boiling constituents, one having a higher and one having a lower boiling point, from a gas mixture containing the same and a residual gas, by cooling by means of two groups of generators at different temperatures, each group being at such a temperature that in the group of higher temperature only the higher boiling constituent is completely condensed therein and that in the group of lower temperature only a lower boiling component is completely condensed therein and that by means of valves the generators are cyclically connected in such a way, one behind the other, that the gas mixture to be separated is passed in a first period through one regenerator of each group 2, 2' in the direction from the higher temperature regenerator 2 to the lower temperature regenerator 2' for condensing the higher boiling constituent in the higher temperature regenerator 2 and the lower boiling component in the lower temperature regenerator 2'; dividing the residual gas mixture 5 into a first stream 6 and a second stream 7; in a second period passing the first stream 6 through a clean regenerator of the group which is at the lower temperature 4' and then through a regenerator 3 which is at higher temperature and in which in a foregoing first period the higher boiling constituent has been condensed; withdrawing said higher boiling constituent; in a third period work-performingly 8 expanding said second stream to below atmospheric pressure; then pressing it by means of a vacuum pump 9 through a regenerator which is at lower temperature 3' and in which in a foregoing first period the lower boiling constituent has condensed; withdrawing said lower boiling constituent and then passing it through a clean regenerator 4 which is at higher temperature, warming it thereby.

6. Process according to claim 1 in which the pressure of at least one part of the scavenging gas is reduced to below atmospheric pressure.

7. Apparatus for the selective separation of two high boiling constituents, one having a higher and one having a lower boiling point, from a gas mixture containing the same and a residual gas, said apparatus including two groups of regenerators, each group having a first, a second and a third regenerator, being adapted to be operated at the same temperature level, the temperature level of the first group being higher than the temperature level of the second group; a compressor; a valve system connecting the farm end of the first regenerator of the first group to the output of the compressor and the cold end of said regenerator to the warm end of the first regenerator of the second group and connecting the warm end of the second regenerator of the second group to the cold end of the third regenerator of the first group and connecting further the warm end of the third regenerator of the second group to the cold end of the second regenerator of the first group of regenerators; first conduit means connecting the cold end of the first regenerator of the second group with the cold end of the second regenerator of the second group, and second conduit means connecting the cold end of the first regenerator of the second group with the cold end of the third regenerator of the second group.

8. Apparatus as claim in claim 7 in which a vacuum pump is connected to the warm end of the third regenerator of the first group and an expansion machine is interposed in said second conduit means.

References Cited in the file of this patent

UNITED STATES PATENTS

| | | |
|---|---|---|
| 2,504,051 | Scheibel | Apr. 11, 1950 |
| 2,552,560 | Jenny et al. | May 15, 1951 |
| 2,579,421 | Egan | Dec. 18, 1951 |
| 2,584,381 | Dodge | Feb. 5, 1952 |
| 2,660,038 | Pool | Nov. 24, 1953 |
| 2,825,212 | Linde | Mar. 4, 1958 |
| 2,960,836 | Haringhuizen | Nov. 22, 1960 |

FOREIGN PATENTS

| | | |
|---|---|---|
| 644,139 | Germany | Apr. 24, 1937 |
| 707,079 | Germany | June 13, 1941 |
| 744,928 | Germany | Nov. 25, 1943 |